US005233609A

United States Patent [19]

Hunton

[11] Patent Number: 5,233,609

[45] Date of Patent: Aug. 3, 1993

[54] MULTICHANNEL MULTIPLEXER WITH FREQUENCY DISCRIMINATION CHARACTERISTICS

[75] Inventor: J. Keith Hunton, Los Altos, Calif.

[73] Assignee: GTE Government Systems, Mountain View, Calif.

[21] Appl. No.: 852,736

[22] Filed: Mar. 16, 1992

Related U.S. Application Data

[63] Continuation of Ser. No. 573,429, Aug. 27, 1990, abandoned.

[51] Int. Cl.[5] .................... H04J 1/00

[52] U.S. Cl. .................... 370/123; 333/129; 333/132; 333/219

[58] Field of Search .................... 370/123, 69.1, 75, 38, 370/40, 72, 37; 333/129, 132, 219, 130, 131, 165, 166, 167, 173, 174, 175–179, 181, 172, 17.3; 331/172, 9

[56] References Cited

U.S. PATENT DOCUMENTS

| | | | |
|---|---|---|---|
| 4,706,239 | 11/1987 | Ito et al. | 370/75 |
| 4,814,727 | 3/1989 | Mower | 331/172 |
| 4,815,075 | 3/1989 | Cameron | 370/123 |
| 4,839,894 | 6/1989 | Rudish et al. | 370/123 |
| 4,855,691 | 8/1987 | Argintaru et al. | 331/9 |

*Primary Examiner*—Douglas W. Olms
*Assistant Examiner*—Dang Ton
*Attorney, Agent, or Firm*—James J. Cannon

[57] ABSTRACT

A new class of multiplexing filter structure has both the properties of channelized filtering and channelized linear frequency discrimination. The channelized filter-discriminator is intended for use as part of a microwave receiving system possessing a high probability of intercept for incoming signals. The selective properties of the band pass filters provide an interference-reduction capability while the discriminator property provides for instantaneous frequency measurement. The design procedure for achieving a very high degree of discriminator linearity in association with a reasonable selectivity comparable to a maximally flat filter uses theoretical design data provided in a normalized table generated by computer optimization. A hardware realization of a 64 channel multiplexer-discriminator is described and measured data is presented that agrees very closely with the theoretical predictions.

10 Claims, 6 Drawing Sheets

MULTICHANNEL MULTIPLEXER WITH FREQUENCY DISCRIMINATION CHARACTERISTICS

This is a continuation of copending application Ser. No. 07/573,429 filed on Aug. 27, 1990 now abandoned.

BACKGROUND OF THE INVENTION

This invention pertains to a new class of multiplexing filter structures, which filter structures have both the properties of channelized filtering and channelized linear frequency discrimination. Specifically, the channelized filter-discriminator of this invention is intended for use as part of a microwave receiving system possessing a high probability of intercept for incoming signals. The selective properties of the band pass filters provide an interference-reduction capability while the discriminator property provides for instantaneous frequency measurement. In particular, the design procedure for achieving a very high degree of discriminator linearity in association with a reasonable selectivity comparable to a maximally flat filter uses theoretical design data provided in a normalized table generated by computer optimization.

A number of methods for building multiplexers with standard responses (not directed at frequency discrimination) are in current use (J. D. Rhodes and R. Levy, "Design of General Manifold Multiplexers", IEEE Transactions on MTT, Vol. MTT-27, pp 111–123, February, 1979.) The one chosen here for the discriminator application is the terminated-manifold method (W. A. Edson and J. Wakabayashi, "Input Manifolds for Microwave Channelizing Filters", IEEE Transactions on MTT, Vol. MTT-18 pp 270–276, May, 1970) because it is the most suitable for a large number of relatively narrow channels. The even and odd-numbered channels appear on separate manifolds isolated by a power divider and by isolators. The individual channel bandpass filters are coupled to the manifold through transformers that allow a percentage of the power to be coupled into a particular filter if the signal frequency is in its passband. The remaining power is absorbed in the matched load terminating the manifold. At frequencies outside its passband each filter becomes decoupled from the manifold because the input resonator is equivalently series. Since filter frequencies are separated by at least one channel width, very little interaction occurs along the manifold. Interaction between adjacent channels (on opposite manifolds) is negligible because of the isolators.

Each filter has a bandpass response but in addition the response shape is such that the ratio of the output levels of two adjacent channels (their difference in dB) follows a straight-line law for dB vs frequency in the frequency range between the two adjacent channel centers. In a system having many channels, each channel works with its higher and lower-frequency neighbors to produce this same result. A logarithmic detector is used on each filter output.

Early analysis (C. K. Clark, "A High-Probability-Of-Intercept ESM Receiving System For Dense Signal Environments", GTE Report PRE-1143, February 1983) showed that a linear discriminator characteristic using the process described above could be produced by filters with perfectly Gaussian shapes. Rather than trying to synthesize such filters directly, the present invention has as its principal object a computer optimization technique to force the dB difference of two adjacent filter outputs to be a prescribed straight-line law (vs frequency) within a prescribed equal-ripple error.

SUMMARY OF THE INVENTION

In a first aspect of the invention, a computer optimization program to force the dB difference of two adjacent channel filter outputs to be a prescribed straight-line law (vs. frequency) begins with the step of selecting a set of starting parameter values for the equivalent circuit elements of the two adjacent filters. Sample frequencies at which peak error values are expected to occur are also selected for the frequency range between the two adjacent filter center frequencies. After selecting these values, the next step is to compute the difference (in dB) between the transmission responses of the two filters at the sample frequencies. In the following step, one computes the error, which is the difference between the result of the previous step and a prescribed straight line law vs frequency. The next step it to compute the derivatives of this error with respect to all optimizable parameters and with respect to frequency. By allowing many iterations of these steps, changing the parameter values each time, as predicted by the derivative values, the errors at the sample frequencies are continually reduced and, as peaks form, the sample frequencies are moved to coincide with the actual peaks in the error. In the end the error possesses a prescribed number of alternating-sign extrema all equal in magnitude to the prescribed maximum error value.

In a second aspect of the invention, a multichannel multiplexing filter structure having the properties of channelized filtering and channelized linear frequency discrimination, for use in a microwave receiving system possessing a high probability of intercept for incoming signals, comprises a plurality of individual, relatively narrow channels, each of said channels having an individual bandpass filter, and a manifold transmission line comprising two manifolds, each manifold terminating in a matched load and being isolated by a power divider and by isolators. Each of said channels is set by its bandpass filter coupled to said manifold transmission line such that the even and odd-numbered channels appear on separate manifolds, through a transformer allowing a percentage of its power to be coupled into its filter if a received signal frequency is in its passband, the remaining power being absorbed in said matched loads terminating said manifolds. Each of said filters also has four resonators of finite unloaded Q, the unloaded Q's of all resonators being the same, each resonator having two parameters-resonant reactance and resonant frequency, the latter being fixed at the center frequency of each channel. Each of said bandpass filters has the values of its circuit parameters optimized to yield a bandpass response shape such that the ratio of the output levels of any two adjacent channels follows a straight-line law for dB vs. frequency in the frequency range between the two adjacent channel centers, each channel working with its higher and lower-frequency neighbors to produce this same result, and means to tune each filter to match the universal response (with linear frequency scale) of appropriate bandwidth within less than 0.05 dB over the required range (64 MHz) for an accurate discriminator law.

DESCRIPTION OF THE PREFERRED EMBODIMENT

The method of designing and building a multiplexer chosen for the discriminator application of this invention is the terminated-manifold method (W. A. Edson and J. Wakabayashi, "Input Manifolds for Microwave Channelizing Filters", IEEE Transactions on MTT, Vol. MTT-18 pp 270–276, May, 1970) because it is the most suitable for a large number of relatively narrow channels, as depicted in FIG. 1.

Figure 1:
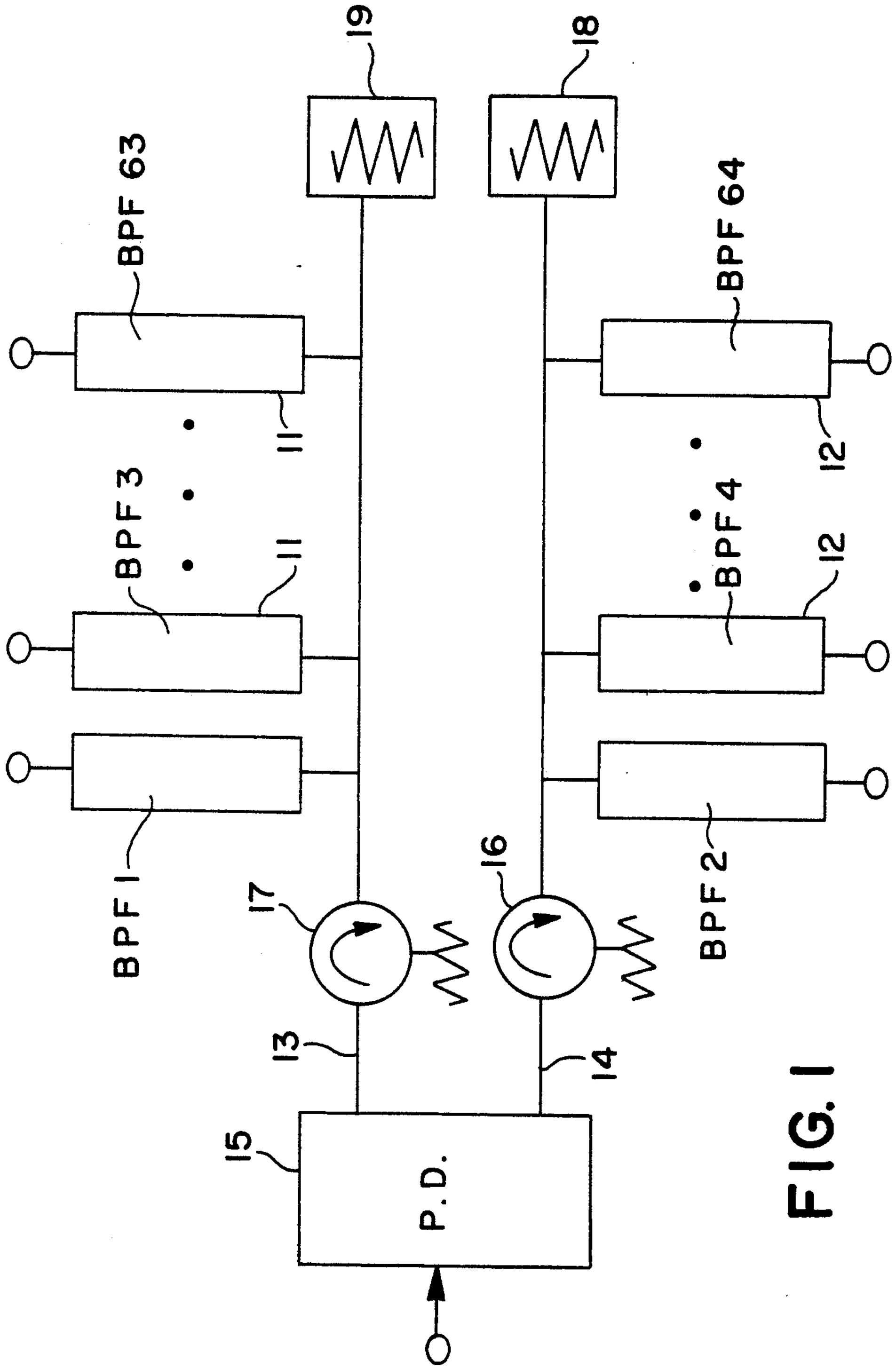
FIG. 1 is a block diagram illustrating the multiplexer-discriminator concept.

In FIG. 1 the even and odd-numbered channels 12, 11 appear on separate manifolds 13, 14 isolated by a power divider 15 and by isolators 17, 16. The individual channel bandpass filters 11, 12 are coupled to the manifold 13, 14 through transformers (not shown), which are inside the bandpass filter boxes, that allow a percentage of the power to be coupled into a particular filter if the signal frequency is in its passband. The remaining power is absorbed in the matched load 18, 19 terminating the manifold. At frequencies outside its passband each filter of group 11 and group 12 becomes decoupled from the manifold 13, 14 because the input resonator (not shown—inside bandpass box) is equivalently series. Since filter frequencies are separated by at least one channel width, very little interaction occurs along the manifold. Interaction between adjacent channels 11, 12 (on opposite manifolds 13, 14) is negligible because of the isolators 16, 17.

Figure 3:
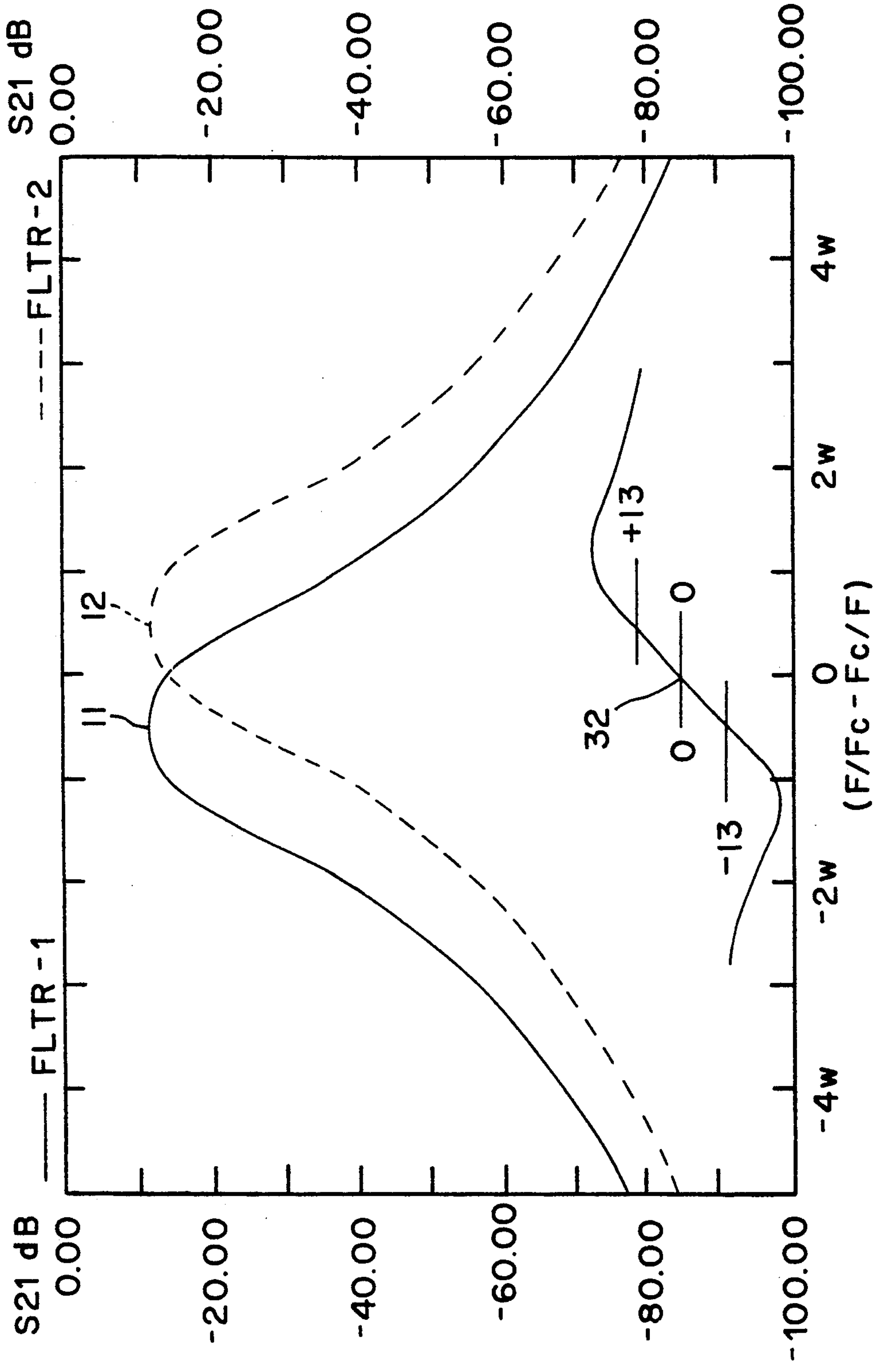
FIG. 3 is a graph showing the computer generated filter discriminator bandpass responses levels of two adjacent channel filters of a typical embodiment of this invention.

Each filter 11, 12 has a bandpass response but in addition the response shape is such that the ratio of the output levels of two adjacent channels 11, 12 (their difference in dB) follows a straight-line law for dB vs frequency in the frequency range between the two adjacent channel centers. This is depicted in FIG. 3 which shows the individual transmission responses of two adjacent channel filters and shows at the bottom middle of the picture the difference 32 of the two responses in dB. The scale on this insert is compressed 2:1. The straight-line portion of this "discriminator curve" extends from −13 dB at the center of the lower frequency filter to +13 dB at the center of the higher frequency filter. In a full system of sixty-four channels, each channel works with its higher and lower-frequency neighbors to produce this same result. A logarithmic detector is used on each filter output.

Early analysis showed that a linear discriminator characteristic using the process described above could be produced by filters with perfectly Gaussian shapes. Rather than trying to synthesize such filters directly, we use a computer optimization technique to force the dB difference of two adjacent filter outputs to be a prescribed straight-line law (vs frequency) within a prescribed equal-ripple error. The optimization technique is an extension of the Remez Method (S. B. Cohn, "Generalized Design of Band-Pass and Other Filters by Computer Optimization", 1974 IEEE-MTT International Microwave Symposium Digest, pp 272–274.) This method is suitable for error minimization when the extrema of the final error as a function of frequency are equal in magnitude and alternating in sign.

In the computer optimization program technique of this invention, a set of starting parameter values for the circuit elements of two adjacent filters is provided. Sample frequencies at which peak error values are expected to occur are also provided for the frequency range between the two adjacent filter center frequencies. At the sample frequencies the difference (in dB) between the transmission responses of the two filters is computed. The error, which is the difference between this and a prescribed straight line law vs frequency, is then computed. The derivatives of this error with respect to all optimizable parameters and with respect to frequency are also computed. By allowing many iterations, changing the parameter values each time, as predicted by the derivative values, the errors at the sample frequencies are continually reduced and, as peaks form, the sample frequencies are moved to coincide with the actual peaks in the error. In the end the error possesses a prescribed number of alternating-sign extrema all equal in magnitude to the prescribed maximum error value.

Figure 2:
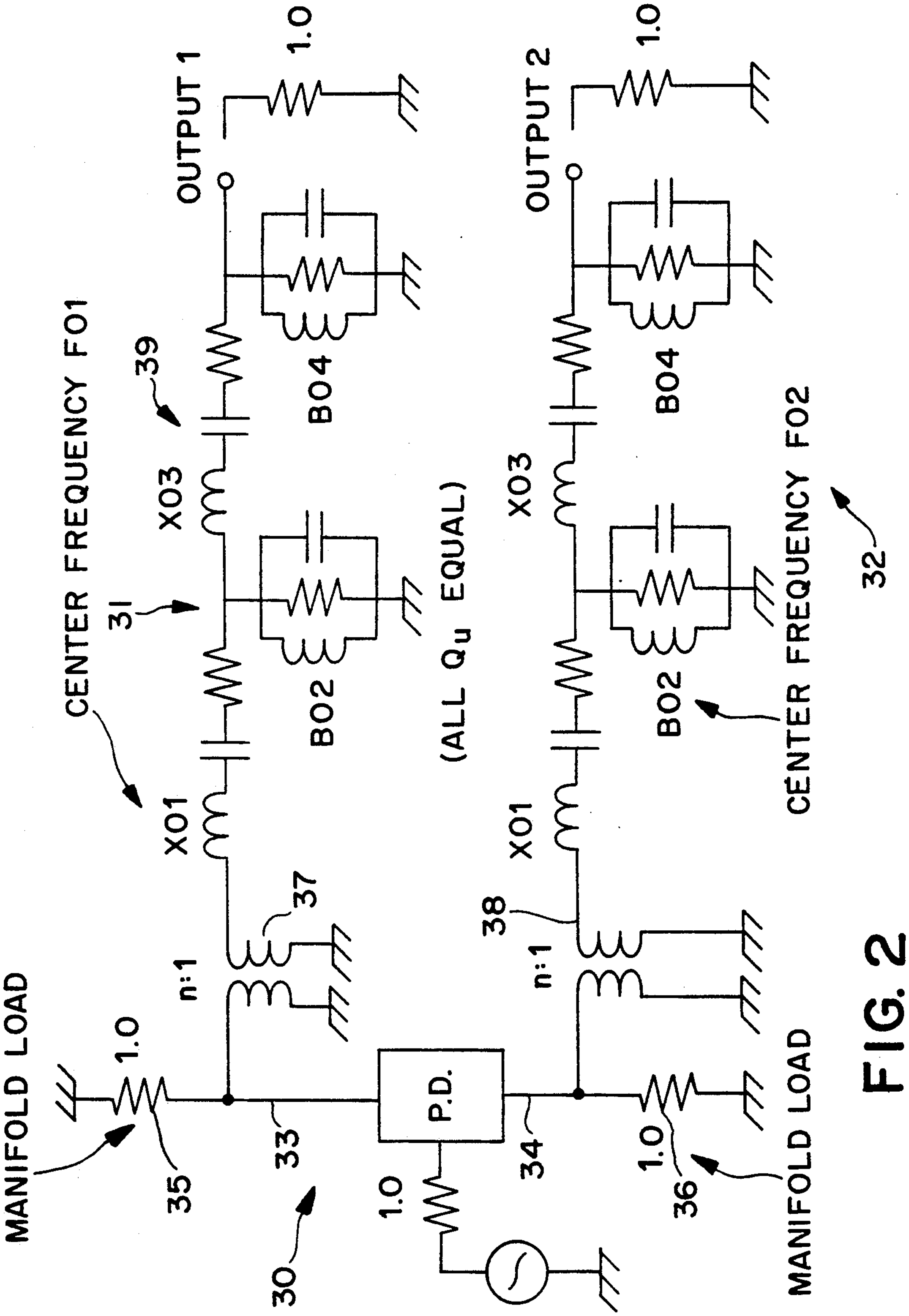
FIG. 2 is a computer model equivalent circuit representation of two adjacent channel filters on opposite manifolds of the design of FIG. 1.

The lumped equivalent circuit representation 30 of two adjacent channel filters 31, 32 on opposite manifolds 33, 34 is shown in FIG. 2. All other filters on each manifold are assumed to be operating in stop bands and therefore are not effectively coupled to the manifolds. Each manifold 33, 34 is then represented by its terminating impedance 35, 36. The transformers 37, 38 allow the percentage of power extracted from the manifold to be adjusted. Each filter has four resonators 39 of finite unloaded Q. The unloaded Q's of all resonators are assumed to be the same and are fixed in the optimization process. Each resonator is represented by two parameters-resonant reactance and resonant frequency. Since the latter is fixed at the center frequency of each channel, each filter has five optimizable parameters inclusive of the transformer turns ratio. If the values of the parameters of corresponding resonators in the two filters are made equal, the two channels will have the same fractional bandwidth. Responses will have symmetry about the center of the frequency axis in the normalized frequency variable $(f/f_c - f_c/f)$ where $f_c$ is the crossover frequency of the channel pair. This means that only the peaks of the error in the lower half of the discriminator frequency range need to be considered in the optimization. Also, if one channel pair is optimized, the values apply to all other channels of the same fractional bandwidth.

Since there are five optimizable parameter values, a maximum of five conditions can be imposed. The choices were: the manifold reflection coefficient at the filter center frequency, the reflection coefficient at crossover, and three equal-peak error values in an equal ripple error with six peaks (3 in the left, half of the frequency range). The first specification fixes the percentage of power extracted from the manifold at each filter's center frequency. The second specification guarantees that the optimization process does not allow a solution that produces a high reflection coefficient within the discriminator bandwidth. The peak error specification includes a straight-line discriminator law with specified slope as the reference for error determination. This law is linear in dB when plotted against the frequency variable $(f/f_c - f_c/f)$.

values. The G values are akin to the normalized low pass prototype filter element values and are derived by multiplying series element resonant reactances and shunt element resonant susceptances by the fractional bandwidth w.

TABLE 1

Computer Optimization Results - Design Data for Multiplexer-Discriminator

| wQu | Slope (dB/bw) | Ins. Loss (dB) | w(50)/w | 1/n | G Values G1 | G2 | G3 | G4 |
|---|---|---|---|---|---|---|---|---|
| 3 | 10 | 13.18 | 7.260 | 0.3918305658 | 0.8611365603 | 0.8625176611 | 0.6115179980 | 0.4787617307 |
| | 14 | 13.47 | 6.982 | 0.3924057301 | 0.9673311081 | 1.004453959 | 0.569087475 | 0.4592965680 |
| | 20 | 14.01 | 6.412 | 0.3900213056 | 1.055911123 | 1.256227309 | 0.6250306531 | 0.4643851966 |
| | 26 | 14.67 | 5.704 | 0.3809062406 | 1.064620306 | 1.554580469 | 0.6846975790 | 0.5717246479 |
| | 32 | 15.53 | 5.004 | 0.3489161691 | 0.9224412932 | 2.188736785 | 0.6078222098 | 0.9211476399 |
| | 38 | 19.50 | 4.346 | 0.1998923943 | 0.3155238667 | 10.93137746 | 0.1704446957 | 3.214547755 |
| 5 | 10 | 11.51 | 7.261 | 0.3873911361 | 0.9228332840 | 0.8314591680 | 0.6040536298 | 0.3829061583 |
| | 14 | 11.67 | 6.998 | 0.3882705494 | 1.030854856 | 0.9351608898 | 0.5882026859 | 0.3682244519 |
| | 20 | 11.96 | 6.444 | 0.3883089283 | 1.144545891 | 1.123558507 | 0.6289537263 | 0.3664715956 |
| | 26 | 12.32 | 5.730 | 0.3859759040 | 1.204024544 | 1.327247866 | 0.7145884720 | 0.4292618831 |
| | 32 | 12.73 | 5.022 | 0.3760445553 | 1.181295862 | 1.613085607 | 0.7499530381 | 0.6063436560 |
| | 38 | 13.45 | 4.377 | 0.3347105664 | 0.9378019103 | 2.631757108 | 0.5240699259 | 1.174774074 |
| 8.5 | 10 | 10.52 | 7.262 | 0.3823219669 | 0.9496551825 | 0.8141377349 | 0.5928408868 | 0.3409292182 |
| | 14 | 10.61 | 7.009 | 0.3829821880 | 1.057583399 | 0.9011513899 | 0.5795182643 | 0.3280811617 |
| | 20 | 10.77 | 6.464 | 0.3833648069 | 1.181079352 | 1.0641314980 | 0.6175941641 | 0.3241183555 |
| | 26 | 10.97 | 5.747 | 0.3827022610 | 1.260400952 | 1.238985459 | 0.7067137532 | 0.3718555785 |
| | 32 | 11.19 | 5.032 | 0.3788625058 | 1.281518756 | 1.448319334 | 0.7786207250 | 0.5008613229 |
| | 38 | 11.50 | 4.387 | 0.3620538496 | 1.162625104 | 1.960111559 | 0.6720495411 | 0.8459018410 |
| 13 | 10 | 10.04 | 7.263 | 0.3793475981 | 0.9605167556 | 0.8058745609 | 0.5860295291 | 0.3234305920 |
| | 14 | 10.09 | 7.015 | 0.3798173889 | 1.068016345 | 0.8859026806 | 0.5734944268 | 0.3113070386 |
| | 20 | 10.20 | 6.475 | 0.3801616767 | 1.195139231 | 1.038503992 | 0.6096477666 | 0.3065716563 |
| | 26 | 10.32 | 5.756 | 0.3799063792 | 1.282101338 | 1.203039329 | 0.6984097521 | 0.3487653491 |
| | 32 | 10.47 | 5.037 | 0.3778830779 | 1.319220773 | 1.389474707 | 0.7815802166 | 0.4612222636 |
| | 38 | 10.64 | 4.392 | 0.3686555893 | 1.244858533 | 1.780158944 | 0.7224737868 | 0.7431717362 |
| 25 | 10 | 9.609 | 7.263 | 0.3764319786 | 0.9691814559 | 0.7984973831 | 0.5793119823 | 0.3090637001 |
| | 14 | 9.636 | 7.020 | 0.3766920817 | 1.076081955 | 0.8727662158 | 0.5673038838 | 0.2975195631 |
| | 20 | 9.689 | 6.485 | 0.3769100983 | 1.205894796 | 1.016878178 | 0.6015168339 | 0.2922180239 |
| | 26 | 9.754 | 5.763 | 0.3768493805 | 1.298809203 | 1.173533085 | 0.6891449959 | 0.3301696668 |
| | 32 | 9.826 | 5.042 | 0.3759905471 | 1.347971838 | 1.344381198 | 0.7795437983 | 0.4303628281 |
| | 38 | 9.911 | 4.395 | 0.3718849934 | 1.306416214 | 1.660173232 | 0.7565032897 | 0.6695077283 |
| 400 | 10 | 9.177 | 7.264 | 0.3732856439 | 0.9769362683 | 0.7910862158 | 0.5720713374 | 0.2957342262 |
| | 14 | 9.179 | 7.025 | 0.3733027832 | 1.083033230 | 0.8599867062 | 0.5604568660 | 0.2847165476 |
| | 20 | 9.182 | 6.494 | 0.3733185990 | 1.215052047 | 0.9962113766 | 0.5925826396 | 0.2789465340 |
| | 26 | 9.186 | 5.771 | 0.3733187751 | 1.313204653 | 1.145941594 | 0.6784767408 | 0.3132062624 |
| | 32 | 9.190 | 5.046 | 0.3732755287 | 1.372640280 | 1.304572602 | 0.7738684325 | 0.4029984334 |
| | 38 | 9.195 | 4.398 | 0.3730560874 | 1.358305572 | 1.566248382 | 0.7810634417 | 0.6083122186 |

Conditions: Coupled Power −9.0 dB; Ripple Error Amplitude ±0.1 dB; Refl. Coeff. at Crossover = Refl. Coeff. at Band Center.

Optimization results for a number of cases are summarized in Table 1. In all cases the extracted power level (at the center frequency of each filter) is 9 dB below the manifold power level. The peak of the equal ripple error in the discriminator response is 0.1 dB. Manifold reflection coefficients at filter center and crossover frequencies are set equal. The six data groups in Table 1 each have a different value of the wQu product shown in column 1. (Here w is the fractional bandwidth of a discriminator channel measured between adjacent filter center frequencies and referenced to the crossover frequency while Qu is the unloaded Q of the resonators in each filter). Results are given for six different discriminator slope values listed in column 2 in dB per bandwidth. Column 3 shows the center frequency insertion loss of the filter. Column 4 shows the selectivity factor, which is the bandwidth at 50 dB down on a filter response divided by the bandwidth between adjacent filter response crossovers. By way of comparison with the table values, a maximally flat filter with the same bandwidth at crossovers and the same unloaded Q would have a selectivity factor, by this definition, of 5.1. In the discriminator design, increasing the slope improves this selectivity factor but can adversely affect the dynamic range. Columns 5 through 9 show the optimized parameter values; column 5 being the transformer turns ratio, and columns 6 through 9, the G The data in Table 1 was derived from optimization runs for a very small fractional bandwidth of 0.00427, which is the value required for the realization of the multiplexer hardware described hereinafter (32 MHz at 7500 MHz). Scaling of resonant reactances and Q's to other bandwidths is accurate to within a fractional bandwidth error $$\sqrt{1 + \frac{w2}{4}} - 1$$

which means that a 1% error in predicted bandwidth will occur at the fractional bandwidth w equal to 0.28. Filter transmission responses for the case in Table 1 where wQu is equal to 8.5 and slope per bandwidth is 26 dB are the ones shown in FIG. 3. Superimposed but with a 2:1 vertical scale compression is the difference between the two responses (in dB), or the discriminator response. If the prescribed discriminator law (vs frequency) is subtracted from this curve, the difference is an equal-ripple error with peak values of 0.1 dB containing 5 zero crossings and 6 extrema with alternating signs. The frequency variable is $(f/f_c - f_c/f)$ where $f_c$ is the crossover frequency. At the filter band edge the frequency variable is equal to the fractional bandwidth w.

Some discussion of interaction between filters on a manifold is in order. Although neighboring filters are separated in frequency by one channel width, the susceptance of an out-of-band filter on the line is not negligible and can affect the tuning of its neighbor. The detuning effect is a function of the coupling and the selectivity factor. The maximum fractional voltage change produced at the filter being tuned by a neighboring filter, appropriately tuned, is approximately B/2 where B is the normalized susceptance of the neighboring filter at the frequency of interest. For the case of the design with 26 dB per bandwidth slope and wQu of 8.5 in Table 1 the normalized susceptance of a filter at a frequency two bandwidths away from its center was computed to be 0.03. This would produce a maximum amplitude error at the center frequency of a neighboring filter being tuned of 0.13 dB. This is low enough to be overcome in the tuning process.

A 64 channel multiplexer-discriminator covering the frequency range 6.992 to 9.008 GHz with channel bandwidths of 32 MHz was designed and constructed for use in a receiving system. The filters are of the evanscent mode type. Early Q measurements showed that a wQu value of 8.5 was appropriate. A discriminator slope of 26 dB per channel bandwidth (32 MHz) was selected as a compromise between selectivity-factor and system-dynamic-range considerations (see line 16, Table 1). The requirement for all channels to have the same bandwidth rather than the same fractional bandwidth means that the optimization results in Table 1 are not directly applicable. An approximate but very close result can be obtained by just using the actual fractional bandwidth of each channel and applying the G values of Table 1 in the usual manner to compute resonant reactances and susceptances in the filters. The reactances and susceptances would increase in direct proportion to the center frequency of the filter. The unloaded Q also has to be scaled directly with frequency or, if the Qu of the filters is known, optimization data for other values of wQu can be used. For the bandwidths of the hardware design a simulation using this approximate approach resulted in an increase in discriminator error from 0.1 dB to 0.15 dB. This is an added error of only 0.05 dB, which is acceptable. This added error would increase with increased fractional bandwidth, however.

With reference to the universal response in FIG. 3, the horizontal axis (frequency) scale becomes linear if the fractional bandwidth is sufficiently small (of the order of 0.005). A universal response with a linear frequency scale can be generated in this way. The filters for the sixty-four channel assembly were designed by the approximate method, but in the testing process each filter was tuned to match the universal response (with linear frequency scale) of appropriate bandwidth. For all sixty-four filters it was possible to match this within less than 0.05 dB over the required range (64 MHz) for an accurate discriminator law. If each filter is tuned within 0.05 dB of the universal curve, the maximum discriminator error should be no worse than 0.2 dB.

The equipment used for the tuning of the multiplexer was an HP 8757A Scalar network analyzer with an HP 8340A synthesized sweep generator, and associated detectors. The desired universal filter response with 32 MHz bandwidth (between crossover points) was stored in the analyzer as 201 samples over a 100 MHz sweep range symmetrical about the filter's center frequency. The error between the standard response and the actual filter response was displayed on the screen superimposed on the actual response so that tuning for minimum error was easily accomplished. The interaction effects described previously were evident when filters were re-visited to check their responses. A "once around" checking and retuning of the 32 filters on a manifold was all that was necessary, however, to achieve the final filter responses required. The prescribed linear discriminator law was also stored in the analyzer and in the final test the discriminator error was displayed.

In the device as designed, built and tested, the two completed manifolds of thirty-two filters each constitute two groups of channels. One group on the first manifold contains even and the other groups contains odd channels. The manifold line is WR112 waveguide. The filters are of the evanescent-mode type and are coupled to the manifold by holes in the waveguide sidewalls. The diameter of a hole determines the turns ratio of the transformer in the equivalent circuit (FIG. 2). The filters are coupled to both side walls of the waveguide rather than being on one side as was indicated in the conceptual block diagram of FIG. 1. The ordering of the filters or their spacing is not important because they are all sufficiently decoupled from the manifold. The tuning screws are of the Johanson self-locking type. There is a tuning screw for each capacitive post, each inter-resonator coupling rod, and also for input and output coupling. The input coupling tuning screw is actually in the manifold waveguide close to the sidewall. It allows a range of adjustment of 2 dB in the transmission without altering the filter-response shape significantly.

The main body is machined in two halves, and the filter cavities are bored and then broached. Copper strips containing the coupling holes are brazed along the waveguide sidewalls. Posts and rods for the filters are also brazed. With the two halves bolted together the termination and the coaxial adaptor are connected at flange joints. The filters in each manifold are tuned with the full assembly connected as in the block diagram of FIG. 1, with power divider and isolators in place. In this way each channel can be tuned for equal output, allowing for differential losses in the two branches.

Figure 4A:
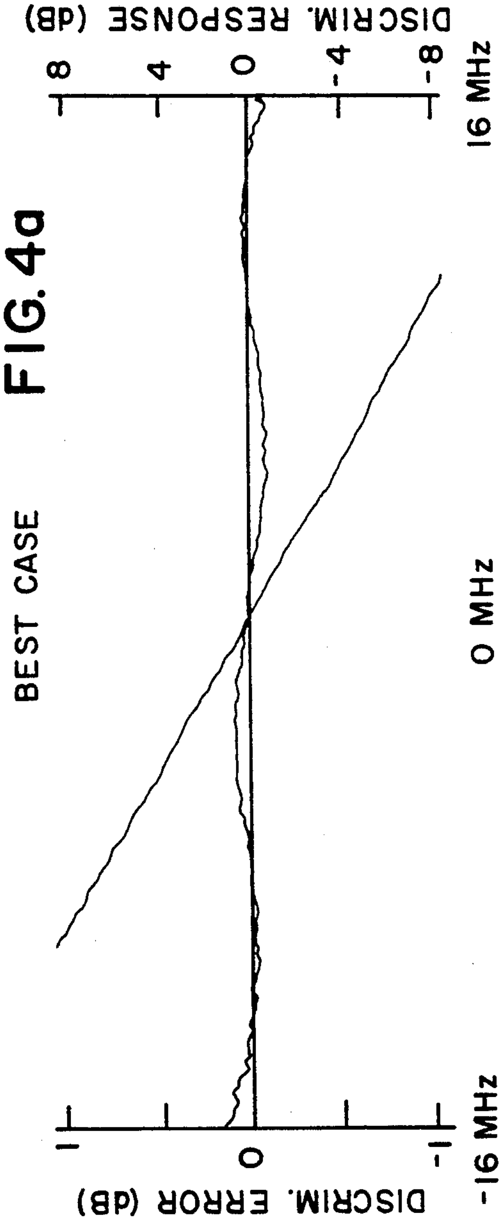
FIGS. 4a, 4b are plots of measured discriminator error for the best and worst cases respectively of an embodiment of the present invention.
Figure 4B:
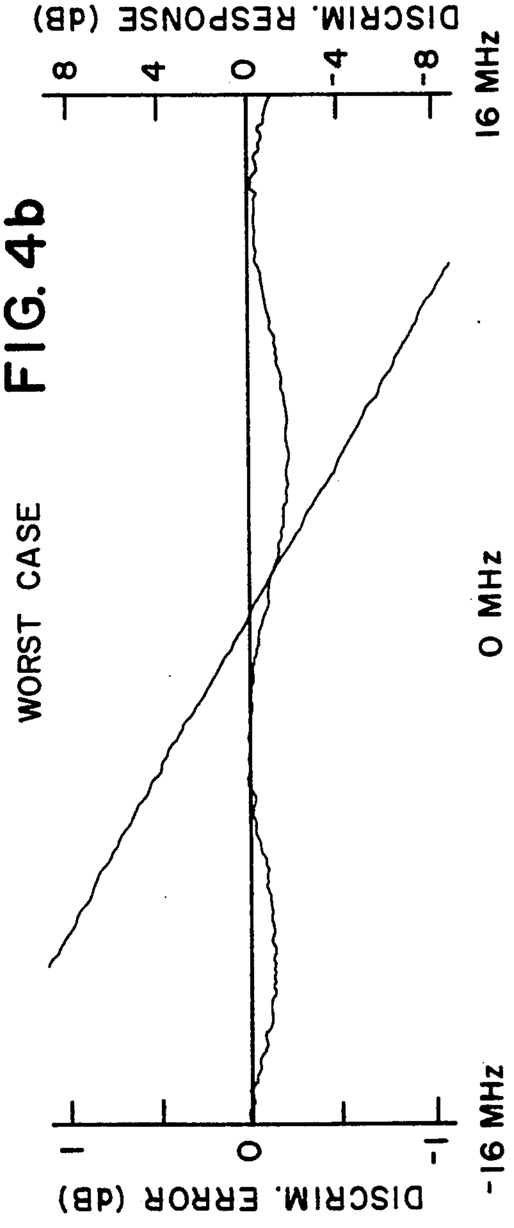

The test results on the 64-channel multiplexer-discriminator are shown in FIGS. **4*a*, 4*b*, 5 and 6. FIGS. 4*a*, 4*b* show the best and the worst measured discriminator error of the 63 discriminator pairs. The best case is the result for channels 33/34. Notice that it is extremely close to the theoretical optimization result with 5 zero crossings and peak error of 0.1 dB. The worst result (channels 9/10**) has a maximum error of 0.25 dB. The results were achieved with one re-visit of all 64 channels for returning. The plots are for 32 MHz sweep range. The measured discriminator law, a segment of which is shown crossing through the center of each picture, goes from 13 dB to −13 dB within the error indicated. Note that with this slope an error of 0.1 dB represents a 0.123 MHz error in frequency determination.

Figure 5:
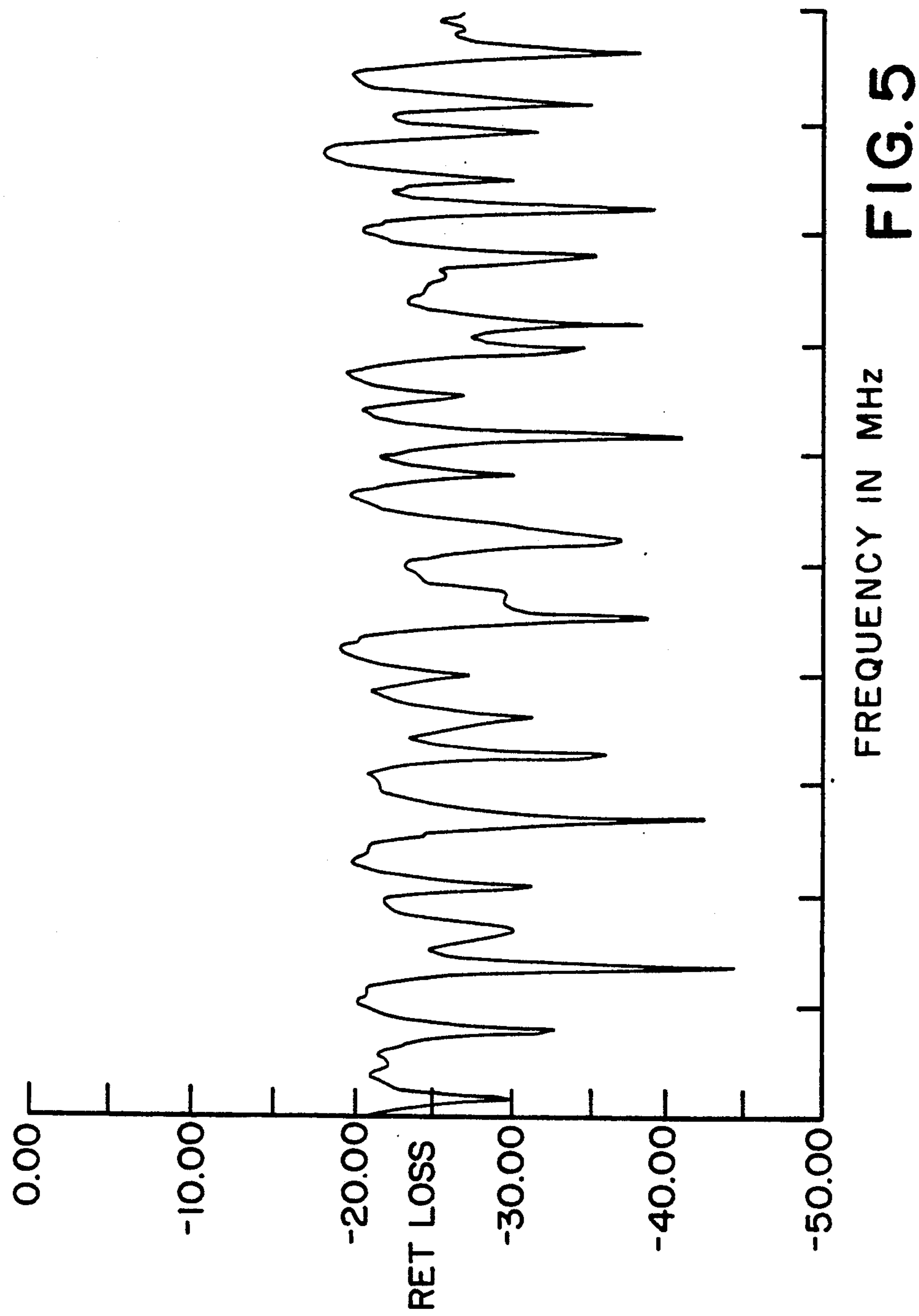
FIG. 5 shows the measured return loss of one thirty-two filter manifold for an embodiment of the present invention.
Figure 6:
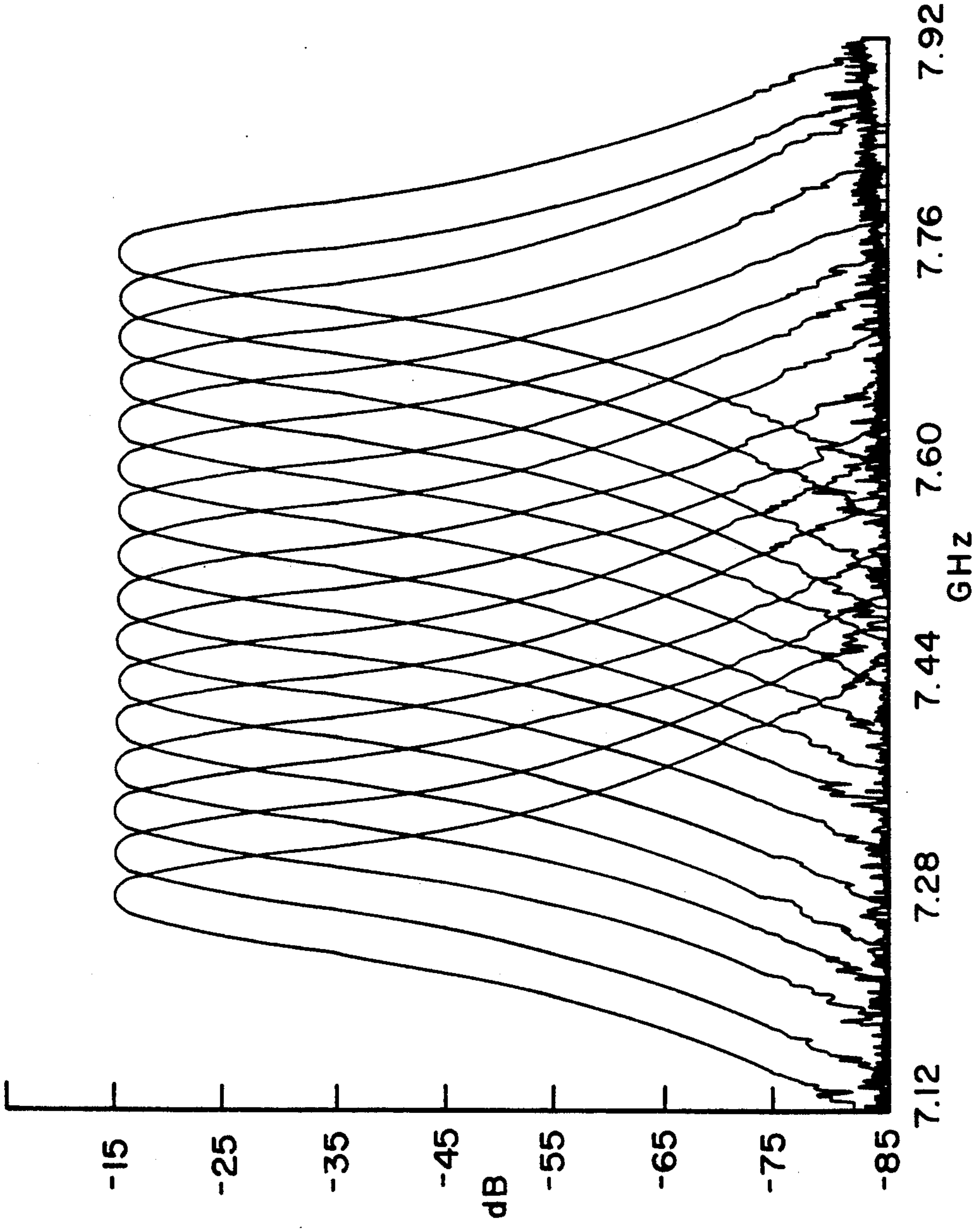
FIG. 6 shows the measured transmission responses for sixteen of sixty-four channels of an embodiment of the present invention.

FIG. 5 shows the measured return loss of one 32 filter manifold. This result is not explainable by the simple model of individual filters coupled via ideal transformers to the manifold line. In that case the return loss would be 23.7 dB at each filter's center frequency and would be much higher in between. The difference is caused by the broad-band reactive effects of the coupling holes in the waveguide. A computer simulation using a symmetrical network with series inductance and shunt capacitance with a transformer coupled to the shunt capacitor was derived from measured data. This model used in a simulation of the 32 coupling holes successfully predicted the measured results for return loss. FIG. 6 shows measured transmission responses for 16 of the 64 channels starting with filter number 9 (7.28 GHz). These responses include the power divider and other losses which were not included in the theoretical model from optimization (FIG. 3). The measured total transmission loss at a filter center frequency is 15 dB. The measured 50 dB bandwidth is very close to the theoretical value (5.75 w) in line 16, table 1.

A theoretical design process and normalized design-table data have been presented for a new class of frequency multiplexers that possess both filtering and linear frequency-discrimination properties. Measured results on a 64-channel multiplexer-discriminator have been shown. A very significant result is the measured discriminator error curve, which is very close to that predicted by the theory. The successful realization of hardware is largely dependent upon a filter tuning process that is referenced to a computer-generated "standard" band-pass channel response stored in the memory of a scalar network analyzer used for measurement of the response and its error.

I claim:

1. A multichannel multiplexing filter structure having the properties of channelized filtering and channelized linear frequency discrimination, for use in a microwave receiving system possessing a high probability of intercept for incoming signals, comprising:

a plurality of individual, relatively narrow channels;

each of said channels having an individual bandpass filter;

a manifold transmission line comprising two manifolds, each manifold terminating in a matched load, and a power divider and by isolators isolating said manifolds;

each of said channels being set by its bandpass filter coupled to said manifold transmission line such that the even and odd-numbered channels appear on separate manifolds, through a transformer within said bandpass filter allowing a percentage of its power to be coupled into its filter if a received signal frequency is in its passband;

the remaining power being absorbed in said matched loads terminating said manifolds;

each of said filters having four resonators of finite unloaded Q, the unloaded Q's of all resonators being the same;

each resonator having two parameters, resonant reactance and resonant frequency, the latter being fixed at the center frequency of each channel;

each of said bandpass filters having the values of its circuit parameters optimized to yield a bandpass response shape such that the ratios of the output levels of all pairs of adjacent channel filters are linear with respect to a straight-line law for dB vs. frequency in the frequency range between the center frequencies of said pairs of adjacent channels, each channel working with its higher and lower-frequency neighbors to produce this same result; and means to tune each filter to match the universal response with linear frequency scale of appropriate bandwidth within less than 0.05 dB over the required range '64 MHz' for an accurate discriminator law.

2. The multiplexing filter structure of claim 1, wherein said multiplexing filter structure covers the frequency range of 6.992 to 9.008 GHz with channel bandwidths of 32 MHz.

3. The multiplexing filter structure of claim 1, wherein said optimized circuit parameters have been computed by an iterative process beginning with a lumped equivalent circuit representation of two adjacent channel filters, one on each manifold, selected from said channel filters of said plurality of channels, for analysis with respect to linearity of frequency discrimination, and a set of initial parameter values for the circuit elements of said equivalent circuit representation and sample frequencies at which peak error values are likely to occur for the frequency range between the center frequencies of said two adjacent bandpass filters.

4. The multiplexing filter structure of claim 3, wherein said iterative process calculated the differential amplitude between a signal output of the first of said two adjacent filters and that of the second at the frequencies of the predicted error extreme, and computed an error result representing the difference between said differential amplitude and a straight-line law vs. frequency.

5. The multiplexing filter structure of claim 4, wherein said iterative process computed the derivatives of said errors with respect to all optimizable parameters and with respect to frequency, and changed said initial parameter values to values predicted by said computed derivative values.

6. The multiplexing filter structure of claim 5, wherein said iterative process was repeated until errors at said sample peaks were reduced and said sample peaks coincided with actual peaks in said error, such that the error in the frequency discriminator curve relative to a straight line law was a minimum equal-ripple value over the desired frequency range.

7. The multiplexing filter structure of claim 6, wherein the results of said iterative process were applied to all pairs of adjacent filter channels in said multiplexing filter.

8. The multiplexing filter structure of claim 7, wherein said iterative process terminated when the error vs. frequency has equal extreme of the value prescribed.

9. A method for optimizing the parameters of a multiplexing filter having a plurality of individual channel bandpass filters appearing equally on two separate manifolds isolated by a power divider, with the properties of channelized filtering and channelized linear frequency discrimination, comprising the steps of:

a. providing a lumped equivalent circuit representation of two adjacent channel filters, one on each manifold, selected from said plurality for analysis with respect to linearity of frequency discrimination;

b. providing a set of initial parameter values for the circuit element of said equivalent circuit representation and sample frequencies at which peak error values are likely to occur for the frequency range between the center frequencies of said two adjacent bandpass filters;

c. calculating, for all pairs of adjacent channel filters, the differential amplitude between the signal output of the first of any of said two adjacent filters and that of the second at the frequencies of the predicted error extreme;

d. computing an error result representing the difference between said differential amplitude and a straight-line law vs. frequency;

e. computing the derivatives of said errors with respect to all optimizable parameters and with respect to frequency;

f. changing said initial parameter values to values predicted by said computed derivative values;

g. repeating steps c, d, e and f until errors at said sample peaks are reduced and said sample peaks coincide with actual peaks in said error, such that the error in the frequency discriminator curve relative to a straight line law is a minimum equal-ripple value over the desired frequency range;

h. applying the results of said previous steps to all adjacent filter channels in said multiplexing filter, thereby optimizing the values of the circuit parameters for each of said bandpass filters to yield a bandpass response shape such that the ratios of the output levels of all pairs of adjacent channel filters is linear with respect to a straight-line law for dB vs. frequency range between the center frequencies of said pairs of adjacent channel, each channel working with its higher and lower-frequency neighbors to produce this same result; and i. tuning each filter to match the universal response with linear frequency scale of appropriate bandwidth within less than 0.05 dB over the required range '64 MHz' for an accurate discriminator law.

10. The method of claim 9, wherein said multiplexing filter covers the frequency range of 6.992 to 9.008 GHz with channel bandwidths of 32 MHz.

* * * * *